2,923,699

PROCESS FOR PRODUCTION OF POLYAMIDES

Heinz Indest, Erlenbach (Main), and Heinz Massat and Helmut Stoehr, Obernburg (Main), Germany, assignors to Vereinigte Glanzstoff-Fabriken A.G., Wuppertal-Elberfeld, Germany No Drawing. Application July 23, 1956
Serial No. 599,354

Claims priority, application Germany July 23, 1955

4 Claims. (Cl. 260—78)

This invention in general relates to processes for the production of polyamides from dicarboxylic acids and diamines, and more particularly to improvements adapted to be used in continuous processes in the production of linear polyamides from aqueous solutions.

The most widely known linear polyamide is nylon, which is made by condensing adipic acid and hexamethylene diamine to form a linear polyamide. Nylon can be made into strong fibers by controlling the molecular weight of the polymer. Those polymers which are spun as nylon threads have molecular weight averages in the order of 12,000–20,000. If the molecular weight is below 6,000, it is unlikely that the polymers will form fibers at all. The fibers that are formed with polymers in the range of 6,000–10,000 average molecular weight are relatively weak and brittle, but as the degree of polymerization and molecular weight increase, the fibers become strong. Correspondingly, the molecular weight must not be allowed to become too high for, if it is well over 20,000, the polymers become difficult to melt or to dissolve. Therefore, the process of polymerization or condensation must not be allowed to go on indefinitely, but must be stopped within a given molecular weight range. This is achieved by a step known as stabilization. If, instead of taking exactly equivalent quantities of adipic acid and hexamethylene diamine, an excess of one or the other in a slight amount, e.g., 0.1–5%, is used, eventually the polymer molecules will have either carboxyl groups or amine groups at both ends of the molecules, depending on which ingredient was used in excess. When this happens it is impossible for polymerization to proceed further. The same result can be achieved by including in the reaction mixture a small amount of a monofunctional acid or amine such as acetic acid.

In order that the reaction go to completion, it is necessary to eliminate from the reaction mass most of the water of solution as well as water produced during the condensation reaction. A basic problem in elimination of water lies in keeping the heat input as high as the heat output, mainly in the form of steam, so that the reaction mass is not cooled below the melting point of the polyamide.

In the production of linear polyamides, especially from dicarboxylic acids and diamines, both the initial reaction mixture and the final product have a melting point which is far above the boiling point of water. If aqueous solutions of the salts formed between dicarboxylic acids and diamines are employed, evaporation of the water must be carried out at superatmospheric pressure in order to keep the condensation product in molten form. In a batch process the normal procedure is to evaporate the greater part of the water under superatmospheric pressure at a temperature which is initially above the melting point of the base material and which toward the end of the reaction rises above the melting point of the polyamide. In the process, the pressure gradually falls, and more water is released as steam. The temperature is raised further by the additional condensation. Finally, the polyamide formed in this manner, after reaching the desired viscosity, is pressed or pumped out of the autoclave in the form of ribbons or similar shapes, being cooled at the same time.

The development of a continuous process for condensation of polyamides from aqueous solutions has imposed several difficulties. Because the polyamide hardens when condensed only to a slight extent at the atmospheric boiling point of water, a continuous condensation cannot be carried out under atmospheric conditions. It has been suggested that the evaporation of water contained in the molten polyamide be undertaken in thin layers. In this procedure, however, difficulties arise with relatively large batches because it is not feasible to transfer the necessary heat through the heating surfaces to keep the thin layers of polyamide in molten form.

If the water is evaporated as much as possible at superatmospheric pressure at temperatures above the melting point of the polyamide, a point wherein the molten mass contains about 10% water, difficulties arise when this mass is released to atmospheric pressure. The water evaporates very rapidly when the pressure is diminished, draws its heat requirements from the molten mass and cools the molten polyamide below its melting point. A renewed heating of the solidified products is then impossible in a continuous process because the heat transfer from the heating surfaces to the polyamide is not adequate, and such long periods are necessary for melting that decomposition of the polyamide is likely to begin.

It has been proposed further that the release of pressure be undertaken in a heated tube of increasing diameter. In a tube that widens at defined intervals, the diminution of pressure ensues gradually. The heating of this tube is then adequate to maintain the temperature above the melting point of the polyamide and, if necessary, to increase it further. The disadvantage of such a device, however, lies in the fact that it is not possible, during the release of pressure, to simultaneously remove the water vapor that forms. As large volumes of steam develop, the molten polyamide can no longer flow continuously.

It has also been suggested that the production of polyamides be carried out with a constant quantity of base material which is subjected to successive stages in a heating apparatus whereby a stage of higher pressure and a stage of lower pressure always alternate. This procedure, however, involves complicated and elaborate apparatus in which each stage must be regulated according to quantity of flow and pressure. Other difficulties arise in the uneven flow of the molten polyamide which begins to decompose at the temperatures employed after extended heating in an area of low rate of flow.

We have discovered a method for removing the water from the molten polyamide, which method is particularly adaptable for use in a continuous process. Briefly, the aqueous solution of the base material may be freed in a first zone from the greater part of water under superatmospheric pressure, preferably from 15 to 20 atmospheres, and at temperatures over the melting point of the reaction mass. The latter portions of water are removed in a second zone by the introduction of an inert, substantially dry gas or vapor stream of substantially the same pressure and temperature as the temperature and pressure of the molten polyamide. The water is removed at an even rate as a vapor in the gaseous fluid stream.

More particularly, the gaseous fluid may be any gas or vapor which is acid-free and will not react with the polyamide. Examples of such gaseous fluids include nitrogen; hydrogen; gases of the argon group; carbon dioxide; gaseous hydrocarbons such as gasoline fractions, benzene and several of its homologs; aliphatic hydrocarbons such as methane, ethane, propane, butane, etc.; and aliphatic and cyclic ethers such as diethyl ether and tetrahydrofuran. The water in the molten polyamide, that remaining from the aqueous solution or formed as condensation further proceeds, evaporates into the gas or vapor stream in a regular or gradual manner so that a sudden and violent cooling of the molten mass, which would lead to hardening, is avoided without complex procedures or apparatus.

The introduction of the inert gaseous fluid can be undertaken in various ways. A particularly effective method involves the pumping of the molten mass through a nozzle or nozzles in a finely divided state while directing the gaseous fluid countercurrently against the molten mass as it emerges from the hole of the nozzle. The inert gaseous fluid also may be brought into intimate contact with the finely divided spray in a direction perpendicular to that of the spray. It is also possible to diffuse the gaseous fluid in a finely dispersed state by means of a nozzle into a body of the molten polyamide.

In all cases the gas or vapor stream becomes laden with water vapor and removes it from the molten mass at a regular rate. The complete condensation of the molten polyamide to the desired viscosity is thus made possible in a continuous process. The water vapor laden gaseous fluid is circulated through a heat exchanger and cooler in which the vapor stream is liquefied so that the water from the liquid phase can be removed either by separation of layers or by distillation. Residual amounts of water vapor are removed in an absorption tower. The dry gas can then be recirculated through the reaction vessel after it is heated and brought to the proper pressure.

The now dehydrated molten polyamide, whose relative viscosity after further condensation has risen from about 1.5 to 2.0–2.5, can be released from the bottom of the pressure container into a vessel at atmospheric pressure which is likewise heated whereby any gas or vapor bubbles carried along with the polyamide can separate. If necessary a vacuum may be applied to accelerate this process. The fully condensed molten polyamide is then continuously conducted from this vessel to a spinning apparatus or poured out as a ribbon to be broken up in a solid state.

Our invention may be further understood from the following examples:

*Example I*

A 60% solution of equimolar parts of hexamethylene diamine and adipic acid in water at 80° C. with the addition of 0.6 mol percent acetic acid is pumped evenly by means of a pressure pump into a pressure evaporator heated to 280° C. through a tubular preheater, which is heated to from 280 to 300° C. The temperature of the solution rises to 275° C. during the evaporation of the greater part of the water. The quantity of the vapor emitted is so controlled by a pressure-operated regulator, that a water-vapor pressure of 18 atmospheres is maintained. The partially condensed polyamide, which still contains from 8% to 13% by weight of water, based on the molten mass, is conducted through a regulator controlled by the liquid level into the second part of the apparatus. This consists of a liquid circulation apparatus in which the molten mass under a pressure of 17.5 atmospheres is pumped in circulation through a nozzle with several holes of the type of a shower fixture, whereby a fine distribution of the molten mass is achieved. A nitrogen stream of the same pressure at a temperature initially of 290° C. flows against the finely divided molten polyamide as it drops. The water content of the molten polyamide decreases to less than 0.3%, and a relative viscosity of the molten mass from 2.1 to 2.3 is achieved. The newly added partially condensed polyamide enters the system continuously directly in front of the circulating pump while the fully condensed product, passing from the sump through a regulator controlled by a level, is released from pressure at an even rate and enters the third part of the apparatus. The nitrogen leaving the apparatus under the control of a pressure regulator is cooled to from 15 to 20° C. over a heat exchanger, in which, at the same time, the entering nitrogen is preheated, and over a cooler while the pressure is maintained and the separated water is continuously removed. By means of a gas circulating pump the nitrogen is thereupon conducted under the same pressure through an absorption column filled with silicon gel, fully dried and pumped back into the column through the heat exchanger and a preheater. When the silicon gel column has become saturated with water, one can switch over to a second column of the same kind and regenerate the first. The fully condensed polyamide, as it leaves the second part of the apparatus, still contains small quantities of nitrogen, which are dissipated in the third part of the apparatus, a pressureless collecting vessel.

In a quiescent period of one hour, the viscosity of the poylamide rises to 2.4 to 2.7, measured as relative dissolving viscosity. From this vessel the condensate is conducted over a pump controlled by a level to the spinning apparatus.

*Example II*

A 60% solution of hexamethylene diamine and adipic acid in water with acetic acid added is precondensed exactly as in Example I in a pressure evaporator under 18 atmospheres. The molten mass, containing 8% to 13% by weight of water, is conducted into the second part of the apparatus. This consists of a tube which is two-thirds filled with the molten mass. In the lower third there is a perforated ring of half the diameter of the tube. By means of a liquid pump benzene is brought to a pressure of 17.5 atmospheres and preheated by a superheater to 290° C. so that the benzene vapor at 17.5 atmospheres disperses from the perforated ring in fine bubbles into the molten mass. The benzene vapor rises and thereby absorbs the water vapor. The vapor then enters the upper third of the tube, the vapor space, which facilitates the separation of any entrained liquid, and from this space the vapor, passing through a pressure-controlled valve, is released into a cooler. The condensate consists of benzene and water. The benzene layer is dehydrated in a familiar way by distillation of the azeotropic benzene-water mixture and conducted back to the liquid pump. The molten mass remains in the apparatus for three hours. It leaves at the base of the tube through a valve controlled by the liquid level into a pressure-release vessel as in Example I, in which the holding period is one hour. The finished linear polyamide of a relative viscosity of from 2.4 to 2.5 is conducted through a pump and fed in ribbon-form into water and, after cooling, is reduced by means of a cutting machine.

The invention is hereby claimed as follows:

1. A continuous process for the production of linear polyamides which comprises introducing into a first zone an aqueous solution of approximately equimolar parts of an aliphatic, saturated, dicarboxylic acid and an alkylene diamine having two primary amino groups, condensing said aliphatic, saturated, dicarboxylic acid and said alkylene diamine in the form of a polyamide in said first zone by evaporating at superatmospheric pressure between about 15 and 20 atmospheres a major portion of the water in said first zone at a temperature sufficiently high to keep the condensed polyamide in a fluid state in said pressurized first zone, removing the evaporated water from said first zone, continuously withdrawing from said first zone a polyamide molten mass still containing about 8–13% by weight of water, based on the molten mass, and continuously introducing the molten mass withdrawn from said first zone into a second zone maintained at superatmospheric pressure between about 15 and 20 atmospheres and further condensing said polyamide introduced into said second zone by evaporating from the molten mass additional water by intimately comingling the molten mass with a preheated, substantially dry, inert, gaseous fluid in said pressurized second zone while maintaining the temperature in said second zone above the melting point of the polyamide therein, whereby the water in the molten mass evaporates into said gaseous fluid, continuously withdrawing the polyamide from said second zone, and removing the water vapor-laden gaseous fluid from said second zone.

2. A continuous process for the production of linear polyamides which comprises introducing into a first zone an aqueous solution of approximately equimolar parts of an aliphatic, saturated, dicarboxylic acid and an alkylene diamine having two primary amino groups, condensing said aliphatic, saturated, dicarboxylic acid and said alkylene diamine in the form of a polyamide in said first zone by evaporating at super atmospheric pressure between about 15 and 20 atmospheres a major portion of the water in said first zone at a temperature sufficiently high to keep the condensed polyamide in a fluid state in said pressurized first zone, removing the evaporated water from said first zone, continuously withdrawing from said first zone a polyamide molten mass still containing about 8–13% by weight of water, based on the molten mass, and continuously introducing the molten mass withdrawn from said first zone into a second zone by spraying the molten mass from said first zone into a second zone maintained at superatmospheric pressure between about 15 and 20 atmospheres into a stream of a preheated, substantially dry, inert, gaseous fluid flowing through said second zone to evaporate additional water from the molten mass while maintaining the temperature in said second zone above the melting point of the polyamide therein, whereby the water in the sprayed molten mass evaporates into said gaseous fluid, continuously withdrawing the polyamide from said second zone, and removing the water vapor-laden gaseous fluid from said second zone.

3. A continuous process for the production of linear polyamides which comprises introducing into a first zone an aqueous solution of approximately equimolar parts of adipic acid and hexamethylene diamine, condensing the hexamethylene diamine and adipic acid into a linear polyamide in said first zone by evaporating at superatmospheric pressure between about 15 and 20 atmospheres a major portion of the water in said first zone at a temperature sufficiently high to keep the condensed polyamide in a fluid state in said pressurized first zone, continuously withdrawing from said first zone a polyamide molten mass still containing about 8–13% by weight of water, based on the molten mass, and continuously introducing the molten mass withdrawn from said first zone into a second zone maintained at superatmospheric pressure between about 15 and 20 atmospheres and further condensing said polyamide introduced into said second zone by evaporating from the molten mass additional water by intimately comingling the molten mass with a preheated, substantially dry, inert, gaseous fluid in said pressurized second zone while maintaining the temperature in said second zone above the melting point of the polyamide therein, whereby the water in the molten mass evaporates into said gaseous fluid, continuously withdrawing the polyamide from said second zone, and removing the water vapor-laden gaseous fluid from said second zone.

4. A continuous process for the production of linear polyamides which comprises introducing into a first zone an aqueous solution of approximately equimolar parts of adipic acid and hexamethylene diamine, condensing the hexamethylene diamine and adipic acid into a linear polyamide in said first zone by evaporating at superatmospheric pressure between about 15 and 20 atmospheres a major portion of the water in said first zone at a temperature sufficiently high to keep the condensed polyamide in a fluid state in said pressurized first zone, removing the evaporated water from said first zone, continuously withdrawing from said first zone a polyamide molten mass still containing about 8–13% by weight of water, based on the molten mass, and spraying the molten mass withdrawn from said first zone into a second zone maintained at superatmospheric pressure between about 15 and 20 atmospheres into a stream of preheated, substantially dry, inert, gaseous fluid flowing through said second zone to evaporate additional water from the molten mass while maintaining the temperature in said second zone above the melting point of the polyamide therein, whereby the water in the molten mass evaporates into said gaseous fluid, continuously withdrawing the polyamide from said second zone, and removing the water vapor-laden gaseous fluid from said second zone.

References Cited in the file of this patent

UNITED STATES PATENTS

| | | |
|---|---|---|
| 2,130,523 | Carothers | Sept. 20, 1938 |
| 2,163,636 | Spanagel | June 27, 1939 |
| 2,165,253 | Graves | July 11, 1939 |
| 2,172,374 | Flory | Sept. 12, 1939 |
| 2,224,037 | Brubaker et al. | Dec. 3, 1940 |
| 2,241,322 | Hanford | May 6, 1941 |
| 2,742,451 | Heisenberg et al. | Apr. 17, 1956 |